United States Patent [19]

Buechner et al.

[11] 4,082,910

[45] Apr. 4, 1978

[54] MULTI-STAGE ISOLATION OF HIGH PRESSURE POLYETHYLENE

[75] Inventors: Oskar Buechner, Dudenhofen; Gottfried Schlichthaerle, Neustadt; Friedrich Urban, Limburgerhof, all of Germany

[73] Assignee: BASF Aktiengesellschaft, Ludwigshafen, Germany

[21] Appl. No.: 687,873

[22] Filed: May 19, 1976

[30] Foreign Application Priority Data

May 31, 1975 Germany .................................. 2524204

[51] Int. Cl.$^2$ ............................. C08F 6/26; C08F 6/28
[52] U.S. Cl. ................................ 528/481; 260/676 R; 526/64; 526/352; 528/501; 528/503
[58] Field of Search ..................... 528/481, 501, 503; 260/676 R

[56] References Cited

U.S. PATENT DOCUMENTS

| | | | |
|---|---|---|---|
| 2,646,425 | 7/1953 | Barry | 260/94.9 |
| 3,201,365 | 8/1965 | Charlesworth et al. | 260/34.2 |
| 3,336,281 | 8/1967 | Eilbracht et al. | 260/94.9 |
| 3,412,080 | 11/1968 | Smith et al. | 260/94.9 |

*Primary Examiner*—Stanford M. Levin
*Attorney, Agent, or Firm*—Keil, Thompson & Shurtleff

[57] ABSTRACT

A process for the manufacture of ethylene polymers by high pressure polymerization of ethylene, if desired mixed with other compounds copolymerizable with ethylene, and isolation of the reaction product in a multi-stage isolation zone. The molecular weight of the ethylene polymer can be varied by varying the mean product residence time in the isolation zone. The isolation zone preferably consists of two stages, with a higher pressure prevailing in the first stage than in the second stage.

5 Claims, 1 Drawing Figure

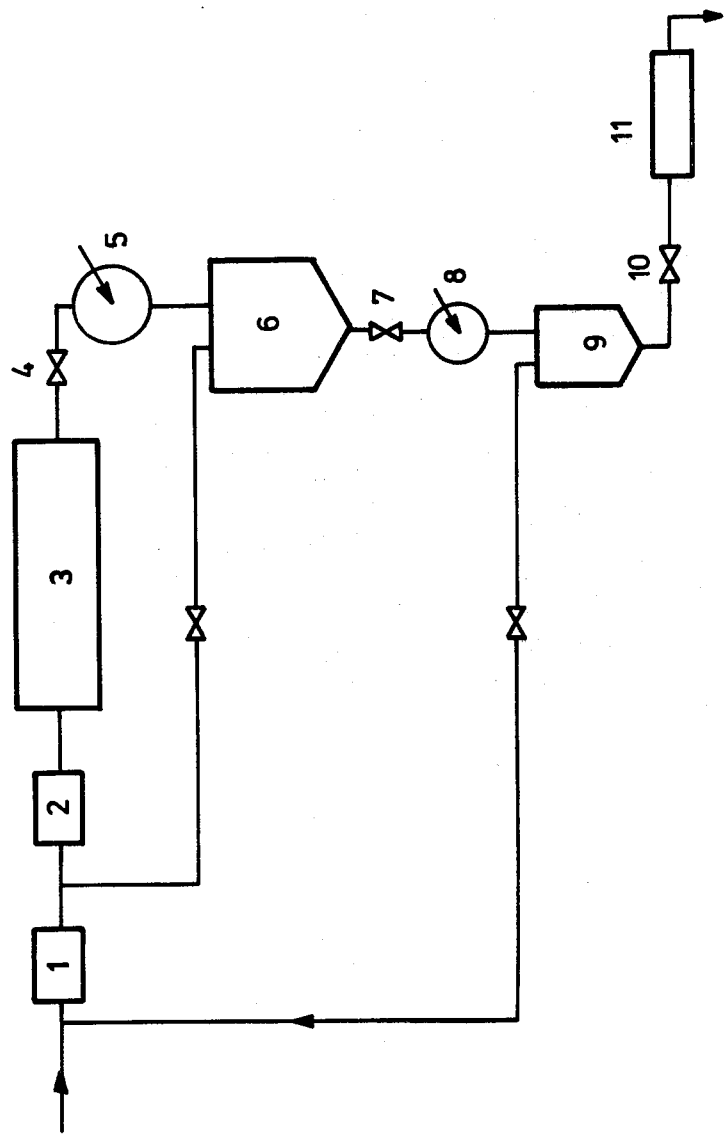

MULTI-STAGE ISOLATION OF HIGH PRESSURE POLYETHYLENE

The present invention relates to a process for the manufacture of ethylene polymers by high pressure polymerization of ethylene, if appropriate mixed with other compounds copolymerizable therewith.

Oily, waxy or solid ethylene polymers can be manufactured by polymerizing ethylene at elevated pressures, if desired together with other compounds which are copolymerizable with ethylene, in the presence of catalysts which form free radicals. The polymerization is in most cases carried out continuously in tubular reactors or stirred autoclaves, the polymers being separated from the volatile components in separators after leaving the reactors. In most cases, this is carried out by means of a high pressure separator, in which the pressure is from 100 to 500 bars, followed by a low pressure separator, which is run at pressures of from 1 to 10 bars.

The properties of the polymers obtained by high pressure polymerization of ethylene may be varied by varying the polymerization conditions. In continuous reactors, when changing over from one type of product to another, the polymerization conditions are adapted to the desired type of product. However, this method is expensive and involved and has the further disadvantage that during the relatively long time required to adapt the reaction conditions in the reactor, polymers are obtained which are off-spec.

It is an object of the present invention to provide a process for the manufacture of ethylene polymers by homopolymerization of ethylene or copolymerization of ethylene with other compounds which are copolymerizable with ethylene, in a polymerization zone at pressures of from 500 to 5,000 bars and at from 50° to 450° C, followed by isolation of the resulting polymer from the reaction mixture in an isolation zone, which does not suffer from the disadvantages of the conventional processes.

We have found that this object is achieved by a process in which a multi-stage isolation zone is operated at pressures of from 1 to 500 bars and at from 100° to 400° C wherein the mean product residence time in the isolation zone is varied during the continuous process within the range of from 0.5 to 60 minutes, the residence time being increased to reduce the molecular weight and decreased to raise the molecular weight.

It is an advantage of the process of the invention that the properties of the polymer can be varied merely by varying the mean product residence time in the isolation zone, without altering the conditions in the polymerization zone. A variation in the mean product residence time in the isolation zone can be achieved relatively simply, without great technical effort and within a short time, so that only relatively small amounts of an off-spec polymer are obtained during the changeover time. Furthermore, unintentional changes in the properties of the end product, resulting from a disturbance of the polymerization conditions in the polymerization zone, can be counteracted by appropriately adapting the mean product residence time in the isolation zone.

The process according to the invention is applicable to the homopolymerization of ethylene and to the copolymerization of ethylene with other compounds copolymerizable with ethylene. These compounds may be any monomers which can conventionally be copolymerized with ethylene under high pressure conditions in the presence of catalysts which form free radicals. Examples of such compounds are acrylic acid and its esters, acrylonitrile, vinyl acetate, acrylamide, vinyl propionate and vinyl ethers.

The polymerization of ethylene, if appropriate together with other compounds, is carried out at pressures of from 500 to 5,000 bars, preferably from 1,500 to 3,500 bars. The temperatures in the polymerization zone are from 50° to 450° C, preferably from 200° to 360° C. The conditions in the polymerization zone can advantageously be realized in tubular reactors and/or autoclave reactors. Tubular reactors are polymerization vessels of which the length is from 5,000 to 50,000 times the diameter of the circular cross-section of the tube. If autoclave reactors are used, in which the inner space in most cases has a ratio of height to diameter of the circular cross-section of from 1:1 to 20:1, the reaction mixture is agitated by means of stirrers. Details of processes in which tubular reactors and autoclave reactors are used are to be found, eg., in Ullmanns Enzyklopaedie der Techn. Chemie, 3rd edition, Volume 14, pages 137-148.

In the process of the invention, the pressure in the isolation zone should be from 1 to 500 bars. The process is advantageously carried out in two stages, the reaction mixture being let down to a pressure of from 100 to 500 bars in the first stage and to from 1 to 10 bars in the second stage. In this isolation zone, the polymer formed is separated from the unconverted volatile components, which are purified, condensed and recycled to the reaction.

According to the invention, relatively short mean product residence times should be used to achieve a high molecular weight and relatively long mean product residence times to achieve a low molecular weight. The mean product residence times in the isolation zone vary from 0.5 to 60 minutes. These product residence times must be suitably chosen for the temperatures and pressures in the particular stage of the isolation zone, and for the desired type of product.

The pressures in the various stages of the isolation zone can be chosen within the range indicated above.

The temperatures in the isolation zone may be varied from 100° to 400° C, but such variation of temperature is not an object of the present invention. At times it is advantageous to vary the mean product residence time (in order to obtain the desired molecular weight) in the first stage of the isolation zone but to keep it constant in the second stage and in further stages, if any. However, it is also possible to employ the converse procedure and to keep the mean product residence time constant in the first stage and vary it in the second stage and in subsequent stages, if any. Furthermore, it is possible to combine both measures and vary the time in the first stage and in the second or other stages. It is particularly advantageous to vary the mean product residence times in the same sense in all stages.

The mean product residence time is the mean time for which the polymer remains in the isolation zone. It is defined as the ratio of the amount of polymer present in the isolation zone to the polymer throughput in the isolation zone per unit time. If the isolation is effected in several stages, it is advantageous to specify a separate mean residence time for each stage.

An indication of the magnitude of the molecular weight is provided by the melt index, commonly abbreviated MFI (melt flow index), and determined according to DIN 53,735. A low melt index indicates a high molecular weight and a high melt index indicates a low molecular weight.

We have found that using the process of the invention it is possible to vary not only the molecular weights but also other product properties by varying the mean product residence time in the isolation zone. Thus, eg., a variation in mean product residence time can in general produce an improvement in the scatter.

The scatter may be determined by means of an apparatus described by E. Schuch in "Kunststoffe", 56 (1966), 350–354. Furthermore, all other properties which are essentially affected by the molecular weight of the polymer may be varied by varying the mean product residence time.

In the isolation zone, the polymer formed in the reactor is separated from the volatile components.

The working conditions in the isolation zone can be realized by means of apparatuses which, in the case of a two-stage isolation apparatus, are described as high pressure separator and low pressure separator. The conventional vessels may be used as the high pressure separator and low pressure separator.

The process according to the invention will now be described for the example of a two-stage isolation zone, with the aid of the appended FIG. I.

The reaction gas (ethylene or a mixture of ethylene and compounds copolymerizable with ethylene) is compressed to the reaction pressure in a pre-compressor 1 and a post-compressor 2 and is fed into the reactor 3 (the polymerization zone), which may be a stirrer reactor and/or a tubular reactor. The polymer formed, and the unconverted compounds, pass from there through a valve 4, in which the reaction mixture is let down from the reaction pressure to the pressure at which it is to be isolated, into the cooling or heating apparatus 5 and from there into the high pressure separator 6 (isolation zone, 1st stage). The volatile phase of the reaction mixture, separated off in the high pressure separator, is fed to the intake side of the post-compressor 2 in order to be re-compressed. The solution, in which the polymer content has thus been increased, passes through the valve 7 and enters the low pressure separator 9 (isolation zone, 2nd stage) via the cooling or heating apparatus 8. The volatile components isolated in the low pressure separator are returned to the intake side of the pre-compressor 1. The polymer passes through the valve 10 and is subsequently processed by conventional methods in the polymer-discharge apparatus 11 (an extruder). The cooling and heating apparatuses 5 and 8 serve to bring the reaction mixture to the temperature which it is intended to have in the high pressure separator and low pressure separator (of the isolation zone). The cooling and heating of the reaction mixture can be effected by conventional methods, either by direct or by indirect heat exchange.

The temperatures in the high pressure separator and low pressure separator are set to from 100° to 400° C.

The mean product residence times in the high pressure separator and low pressure separator may be varied, if the amount of polymer produced per unit time is constant, by varying the amounts of polymer present in the separators, ie. by varying the level of the product in the separators. The level in the high pressure separator is controlled by means of the valve 7. The level in the low pressure separator may be varied by means of the valve 10 or by means of the speed of the polymer discharge apparatus 11.

If the mean product residence times in the high pressure separator and low pressure separator are varied simultaneously, it is advantageous to raise or lower them in the same sense, ie. raise or lower all the residence times.

EXAMPLE 1

About 1,600 kg/hour of a homopolymer are produced in a high pressure tubular reactor. The reaction conditions are set so that the end product, under the conditions in the high pressure separator and low pressure separator indicated in Table I, Setting I, has the polymer properties shown in the Table. If the reaction conditions are kept the same and the temperature in the high pressure separator and low pressure separator are kept approximately constant, an increase in the mean product residence time in the high pressure separator of from 1 to 10 minutes and in the low pressure separator of from 10 to 20 minutes increases the melt index from 1.4 to 6.5 g/10 mins (Table 1, Setting II).

TABLE 1

| Conditions | Setting I | Setting II |
| --- | --- | --- |
| High pressure separator | | |
| Temperature (° C) | 270 | 270 |
| mean product residence time (mins) | 1 | 10 |
| pressure (bars) | 270 | 270 |
| Low pressure separator | | |
| Temperature (° C) | 200 | 200 |
| Pressure (bars) | 4 | 3.5 |
| mean product residence time (mins) | 10 | 20 |
| Product properties | | |
| Density (g/cm³) [1] | 0.922 | 0.920 |
| MFI (g/10 min) [2] | 1.4 | 6.5 |
| +) scatter (%) [3] | 16 | 8 |
| +) strength of a film (g) [4] | 120 | 90 |

+) measured on a 40 μ film
[1] according to DIN 53,479
[2] according to DIN 53,735
[3] determined by means of an apparatus described by E. Schuch in Kunststoffe, 56 (1966), 350–354
[4] Drop Dart Impact Test according to ASTM D 1709-67

EXAMPLE 2

About 1,600 kg/hour of a homopolymer are produced in a high pressure tubular reactor. The conditions in the reactor are set so that under the conditions in the high pressure separator and low pressure separator shown in Table 2, Setting I, the end product has a density[1] of 0.920 g/cm³ and a melt index[2] of 0.5 g/10 mins. On increasing the mean product residence time in the high pressure separator from 0.5 to 20 minutes, an LDPE wax having the properties shown in Table 2, Setting II, is obtained.

TABLE 2

| Conditions | Setting I | Setting II |
| --- | --- | --- |
| High pressure separator | | |
| Temperature (° C) | 390 | 390 |
| mean product residence time (mins) | 0.5 | 20 |
| pressure (bars) | 250 | 250 |
| Low pressure separator | | |
| Temperature (° C) | 300 | 300 |
| mean product residence time (mins) | 10 | 10 |
| pressure (bars) | 2.5 | 2.5 |
| Product properties | | |
| density (g/cm³) [1] | 0.920 | 0.918 |
| MFI (g/10 mins) [2] | 10 | — |
| melt viscosity at 120° C (centistokes) | — | 950 |
| Shore C hardness [3] | 87 | — |
| ball indentation hardness [4] | 18 | — |

[1] according to DIN 53,479
[2] according to DIN 53,735
[3] according to DIN 53,505
[4] according to DIN 53,456

We claim:

1. In a process for the manufacture of ethylene polymers by the continuous homopolymerization or copolymerization of ethylene in a polymerization zone at pressures of from 500 to 5,000 bars and at temperatures of from 50° to 450° C, followed by the isolation of the resulting polymer from the reaction mixture, the improvement which comprises: isolating the resulting ethylene polymer in a two-stage isolation zone at pressures in the first stage of the isolation zone of from 100 to 500 bars and pressures in the second stage of the isolation zone of from 1 to 10 bars and at from 100° to 400° C, wherein the mean product residence time in the isolation zone is varied during the continuous process within the range of from 0.5 to 60 minutes, long residence times within the range of from 0.5 to 60 minutes in the isolation zone being used to achieve a low molecular weight ethylene polymer and short residence times within the range of from 0.5 to 60 minutes being used to achieve a high molecular weight ethylene polymer.

2. A process as set forth in claim 1, wherein the mean product residence time is varied in the first stage of the isolation zone and is kept constant in the second stage and any subsequent stages.

3. A process as set forth in claim 1, wherein the mean product residence time is kept constant in the first stage of the isolation zone and is varied in a subsequent stage.

4. A process as set forth in claim 1, wherein the mean product residence time is increased within the range of from 0.5 to 60 minutes in both the first and the second stage of the isolation zone.

5. A process as set forth in claim 1, wherein the mean product residence time is decreased within the range of from 0.5 to 60 minutes in both the first stage and the second stage of the isolation zone.

* * * * *